Patented July 31, 1951

2,562,840

UNITED STATES PATENT OFFICE 2,562,840

VITAMIN PREPARATIONS

Archie Lee Caldwell, Indianapolis, Ind., assignor to Eli Lilly and Company, Indianapolis, Ind., a corporation of Indiana No Drawing. Application April 27, 1948, Serial No. 23,635

3 Claims. (Cl. 167—81)

This invention relates to vitamin preparations and in particular to preparations of the oil-soluble vitamins, especially vitamin A, in dry, stable, solid form.

A number of vitamins are commonly obtained in an oily, semisolid or waxy form. This is the case, for example, with vitamins A, D, E and K, which are generally prepared from natural substances, as amorphous semisolids or liquids. Moreover, they are naturally labile and are prone to undergo decomposition by oxidation when exposed to the atmosphere, and lose potency rapidly when exposed to light. Because of the state in which they are generally obtained and of their unstable character, their distribution in stable prepared dosage units has involved difficulty and much expense, both in preparing a suitably stable vitamin material and in producing therefrom dosage units of predetermined potency. For example, the widely used procedure of encapsulating a heavy vitamin concentrate in soft capsules has been both troublesome and highly expensive; and it has been generally unsatisfactory to use more convenient and less expensive media such as hard capsules, tablets, pills, or the like. This is especially true with respect to vitamin A, and holds true even when the vitamin is prepared in pure, crystalline form, as when it is obtained by crystallization from natural material or prepared synthetically. Such vitamin A is so unstable that it cannot be distributed in unusual channels or used therapeutically unless it is carefully protected from oxidation and from the effect of light, since its rate of decomposition is very rapid, especially when exposed to light of short wave lengths.

In general, because of the physical and chemical characteristics of the oil-soluble vitamins, particularly vitamin A, various handling problems are inherent in the manufacture of medicinal products containing them, and present obstacles which, which not insuperable, nevertheless impose restrictions and requirements which materially increase the difficulties and cost of manufacture of the products for therapeutic use.

In Taylor Patents Nos. 2,183,053, 2,218,591 and 2,348,503, it was proposed to prepare solid products containing oil-soluble vitamins such as vitamin A in molded forms and small beadlets, consisting of a gelatin matrix with discrete tiny droplets or particles of oil imprisoned therein for the purpose of mechanically protecting the vitamin-bearing oil from exposure to air and from consequent oxidation. Taylor found, however, that such products must be protected from fracture to avoid release of the oil, and that in time a reaction of some sort occurs between the gelatin and the oil which makes the gelatin insoluble and destroys the potency of the vitamin. In Patent No. 2,218,592, Taylor proposes to overcome these difficulties by including in the gelatin a high proportion of honey or molasses as a plasticizer. He reports that this gives some improvement, but he still gets a permanently plastic material which tends to become sticky and to agglomerate, and his reported tests show that the material looses 20 to 25 percent of its potency upon standing for 7 to 10 weeks. In accordance with Taylor's process vitamin oil is dispersed in a viscous gelable gelatin solution, and this is caused to set to a gel and then dried while in gel state. To obtain his product in beadlet form, the oil in gelatin dispersion while in liquid form is itself dispersed in an immiscible liquid such as mineral oil and that double dispersion is then treated to cause the gelatin to set. The resulting particles must then be dried in the presence of the oil, and the oil must then be removed with solvents. In this procedure a considerable quantity of the vitamin-carrying oil becomes mixed with the mineral oil and the solvents, and its recovery is difficult and involves inevitable loss.

It is an object of this invention to prepare dry products containing the oil and oil-soluble vitamins and in which such vitamins are highly stable. Another object of the invention is to provide such vitamin-containing products in free-flowing powder state, suitable for filling ordinary hard capsules, or to form tablets or pills, in prepared dosage units. Still another object of this invention is to provide a product in which such vitamins have high stability against oxidation and loss of potency. Another object of the invention is to provide a process for preparing such solid, stable vitamin preparations which will be convenient and efficient, and will avoid loss of vitamin potency during the processing. Other objects of this invention will become apparent from the following specification.

By my invention I provide a dry solid product, which in the preferred procedure is obtained in powder state, which contains oil-soluble vitamins, either singly or in admixture, and may contain other vitamins. A mixture of vitamins may be embodied in the product as such, or powders may be prepared containing individual vitamins or partial mixtures of vitamins, and these powders may be mixed in dry state as desired. The product, when prepared in large particle size, may be crushed to any desired degree of fineness, and is readily obtained as a free-flowing powder suitable to be filled into hard capsules or embodied in tablets or pills. In such products, the oil-soluble vitamins are indistinguishably merged with the other components and are remarkably stable. Products made in accordance with my invention are found to retain substantially full potency within limits of assay measurement, after periods of 6 to 12 months, even when under relatively extreme conditions of exposure. The process of preparing my product is simple, convenient, and inexpensive, and may be carried out without substantial loss of vitamin potency.

In general, in preparing products in accordance with my invention, I prepare an aqueous non-gelling mixture containing pectin and carbohydrate which is at least partially soluble, and with a solution of oil-soluble vitamin dispersed therein in a state of extremely fine dispersion, desirably in a particle size in the liquid dispersion averaging below about 10 microns and with substantially no particles above about 20 microns; and I dry such mixture directly from the liquid state, preferably by a quick drying process, desirably by spray drying.

The mixture may also include other ingredients, such as other vitamins, and materials to facilitate dispersion of the vitamin-bearing oil and to enhance stability of vitamin potency both during the processing and in the final product. Thus, I desirably include in the mixture a light-absorbing material, such as a dye or mixture thereof, to enhance stability against photo-decomposition. Also, especially when a high proportion of oil is used, I desirably mix with the vitamin-bearing oil an oil-soluble emulsifying agent, preferably one such as lecithin which also has antioxidant properties, and I may include other or additional antioxidants.

The mixture containing the finely dispersed vitamin-bearing oil is desirably produced by mixing liquids containing the several ingredients. In accordance with a preferred procedure, I separately prepare (a) a solution (i. e., a dispersion or colloidal solution) of pectin in water, to which may be added the light-absorbing material and water-soluble vitamins if such are used; (b) a water solution (or dispersion) of the carbohydrate; and (c) a solution containing the desired oil-soluble vitamin or vitamins, to which may be added other oil-soluble ingredients, such as emulsifying agents and antioxidant agents, if such are to be included. These three solutions are then combined in a manner to produce a fine dispersion of the oil in the aqueous phase, as by homogenization. Preferably, the vitamin-containing solution is first dispersed in the pectin solution and this mixture is subjected to homogenization; and the carbohydrate solution is then mixed therewith. Desirably, the carbohydrate solution is added slowly during continued homogenization, conveniently in fractional increments of a third or smaller, and the homogenization is continued between such additions and for a time thereafter.

Because of the lability of the oil-soluble vitamins, especially vitamin A, oxidizing conditions are desirably avoided in the mixing process, most importantly in the early stages of mixing. To this end the ingredients used desirably contain little or no dissolved or adsorbed oxygen, and the mixing is carried out under an inert atmosphere, as under carbon dioxide. In the resulting mixture, however, the vitamins are found to be surprisingly stable, so that it will withstand, for example, the relatively severe oxidizing conditions of spray drying.

The dry product, even when crushed to a fine powder, or dried under conditions yielding a fine powder, which may be in a particle size even smaller than the oil particle size in the liquid dispersion, is highly stable, and provides a product which is of outstanding suitability for distribution with inexpensive packaging and by practices commonly used in packing and distributing other stable dry products. The powder lends itself to filling in ordinary hard capsules by usual procedures, and in such capsules it retains substantially its original potency over long periods of time amply sufficient to meet all normal requirements for distribution through ordinary channels.

In preparing oil-soluble vitamin-containing products in accordance with my invention, the pectin used is conveniently and desirably a fruit pectin, such as citrus pectin, for such is readily available and inexpensive, but other pectins, or mixtures of pectins, may be used. The pectin need not be one which forms a gelable water solution, and I avoid gelation, and hence desirably mix without heating. The pectin is dissolved in water to give a solution of a convenient consistency for mixing and handling during the preparation of the emulsion as set forth below, and to provide in such emulsion a consistency and water content suitable to the selected method of drying. For example, for an emulsion which is to be spray dried, the pectin solution may be prepared to contain about 2 to 5 percent, and desirably about 3 percent of pectin. Desirably the mixing is done under an oxygen free atmosphere, as under carbon dioxide, and the water used is desirably distilled water, to avoid the presence of dissolved oxygen in the solution.

A light-absorbing ingredient or mixture is desirably embodied in the pectin solution especially when the product is to contain the highly photosensitive vitamin A. The light-absorbing material added preferably absorbs light of wave lengths in the range of 3000 to 3400 angstrom units. My investigation indicates that light effects are very much more important than heretofore appreciated; but that no appreciable photo-decomposition, especially of the labile vitamin A, occurs at wave lengths above about 3400 A. U., and that light from an ordinary tungsten-filament lamp or filtered through ordinary bottle or window glass contains no light of wave lengths below about 3000 A. U., and hence in practice that protection in this range of from 3000 to 3400 A. U. effectively avoids photo-decomposition.

Preferably I use certified food colors as the light-absorbing material, such for example as erythrosine, ponceau SX, amaranth No. 107, brilliant blue FCF, etc., but colorless substances may also be used. Light-absorbing substances may be used singly or in an admixture having the desired absorption characteristics. The light-absorbing ingredient or ingredients may be dissolved in the pectin solution by stirring into that solution after or while it is brought substantially to uniform consistency.

Carbohydrates which may be used in preparing the mixture to be dried include soluble and partly solubilized carbohydrates. Thus, the carbohydrate used is at least partly soluble, and may be a starch hydrolysate in which the starch is partly solubilized by the hydrolysis, or may be a hydrolysate in which the degradation has proceeded farther, and may for example be a dextrin or mixture of dextrins, or may be a substantially completely hydrolyzed material, such as glucose. One material which I have found convenient and suitable is a starch hydrolysate available under the trade-name "Stanodex," and containing about 45-50 percent maltose, about 40 percent dextrins, about 7-10 percent glucose, and about 1-2 percent protein. For ready addition to the mixture, the carbohydrate is desirably dispersed in water to form a solution of a convenient consistency for mixing, say in about 40 percent to about 70 percent concentration.

The oil-soluble vitamins may be used singly or in admixtures. Thus, vitamin A alone, or vitamin D alone, or tocopherols alone may be used, or any of these may be used in admixture. When final products containing a plurality of oil-soluble vitamins are desired, and especially where several products are to be made containing different mixtures of vitamins, stock products each containing a single vitamin may be prepared and these may be mixed in a dry state to form the several desired final products. Preferably, however, for multiple vitamin products, I use the oil-soluble vitamins in admixture in solution. Thus, I may conveniently use natural vitamin-bearing oils, such as fish liver oils or concentrates thereof, which contain a plurality of vitamins, for example both vitamins A and D. Instead of natural vitamin-bearing oils, I may use solid vitamin materials, for example crystalline vitamins A or D, or synthetic vitamins, such as synthetic esters of vitamin A. The vitamin material is carried into the emulsion in a solvent, usually an oil, and with material of high potency the solution may be diluted or extended with a water-miscible oil diluent, for example alcohol.

In addition to the vitamins mentioned above, other vitamins may be included in my product, either by mixing them in dry state with the final dry product, or by incorporating them during the process of preparing the dry product.

In addition to the pectin, the carbohydrate, and the vitamins, I may also use emulsifying agents, in effective small amounts. I prefer to use an oil-soluble emulsifying agent, desirably one such as lecithin, which also has antioxidant properties, and as an additional antioxidant I may use one of the type of nor-dihydroguaiaretic acid. These substituents are desirably combined with the vitamin-bearing oil prior to its mixture with the aqueous solutions. The relative amounts of pectin, carbohydrate and oil used may vary, and excesses of pectin or carbohydrate or both may be used, as when the vitamin potency desired permits the use of excesses of non-potent materials. For good recovery of vitamin potency in the dry material and for high stability, I prefer to use a minimum of about 1 part of pectin and a minimum of about 1 part of carbohydrate for each part of oil. Usually the amount of pectin should not substantially exceed about 2 parts of pectin to each part of oil. The amount of carbohydrate may be increased in greater proportion if desired, and I have used up to 6 parts of carbohydrate for each part of oil.

The vitamin oil should be contained in the final liquid mixture in a state of fine dispersion. Measurements in satisfactory mixtures have shown the oil particles to have an average particle size in the range of about 3 to 10 microns, with the smallest particles being of the order of 1 micron in size and the largest not over about 15 microns in size. Any method of mixing may be used which will produce the desired dispersion of the oil in suitable uniformity and particle size. I prefer, however, and have found it effective, first to disperse the oil in the pectin solution and subsequently add the carbohydrate solution. For example, to the pectin solution, after it is mixed to uniform consistency, the vitamin-bearing oil is added and this mixture is first thoroughly stirred and then homogenized, as in a recirculating homogenizer, to produce oil particles of the desired size. An homogenizer in which the material is forced through small openings of about one-sixteenth inch diameter under a pressure about 600 to 1000 p. s. i. has been found effective. When the oil has been dispersed in the pectin solution, the carbohydrate solution is then slowly added to the mixture in the homogenizer, and the homogenization continued during such addition and for a time thereafter.

The final mixture should have a pH value on the acid side, and for optimum results and to avoid loss of vitamin potency, both in the mixture to be dried and especially in the dry product, the pH value of the mixture is desirably in the range from about pH 3 to pH 7. When adjustment of the pH value is found necessary in a particular formula, such adjustment is desirably made in the pectin solution before its admixture with the other solutions, as by the addition thereto of hydrochloric acid or sodium carbonate as may be required.

Drying of the mixture may be by any of a number of methods. For example, products of good stability have been obtained by extruding a thick mixture into a drying atmosphere, and by evaporation of thin layers of the mixture, as under vacuum. I prefer, however, especially when a finely divided, powdery product is desired, to use spray drying.

The following are examples of my invention.

Example 1

A dry vitamin product containing about 40,000 units per gram of vitamin A, 4,000 units per gram of vitamin D, and 18 mg. of natural tocopherols per gram is made as follows:

To 3000 cc. of cool distilled water are added 112.5 g. of citrus pectin, the mixture is stirred under an atmosphere of carbon dioxide, allowed to stand for several hours, and is then intermittently stirred to uniform consistency. High speed stirring of the water and a slow uniform rate of addition of the dry citrus pectin will permit the preparation of the pectin mixture in a relatively short time. To this mixture there are added 7 cc. of a dye solution containing 43.7 mg. of amaranth No. 107, 65.7 mg. of ponceaux SX, and 1.3 mg. of brilliant blue FCF per cc., and the dye solution is thoroughly stirred into the pectin solution.

A separate solution is prepared containing 671.67 g. of "Stanodex" in 975 cc. of freshly distilled water.

An oil-soluble vitamin mixture is prepared by thoroughly stirring together 75.713 g. of vitamin A concentrate (containing 500,000 units per gram), 0.803 g. of vitamin D concentrate (containing 5,000,000 units per gram), and 36.787 g. of oil containing 46 percent natural tocopherols; and there are embodied in this mixture 2.25 g. of lecithin and 0.18 g. of nor-dihydroguaiaretic acid.

The oil vitamin mixture is now stirred into the pectin solution, and this partial mixture is homogenized. For this I have found it convenient to use a recirculating homogenizer in which the mixture is forced through openings of about one-sixteenth inch diameter at a pressure of about 750 pounds per square inch. When the mixture has recirculated through the homogenizer about three times, I then add the carbohydrate solution in one-third increments and continue the homogenization between such additions for a time sufficient for at least one pass of the mixture therethrough. When all of the carbohydrate solution has been added, the homogenization is continued for an additional time to recirculate the mixture therethrough several times.

This yields a final liquid mixture in which the oil is uniformly and finely dispersed, in a particle size averaging below about 6 microns in size and with substantially all of the particles less than about 15 microns in size.

This mixture is now spray dried, by discharging it from a turbine head in a fine spray into a chamber supplied with air at an entering temperature of about 350° F. The dry product is continuously recovered from the drier, and is obtained as a free-flowing fine powder of a particle size which may be of the order of, or even smaller than, the particle size of the dispersed oil in the mixture which is dried.

Dry vitamin material prepared in accordance with this example was subjected to aging exposures to determine stability of vitamin A potency therein. Assays were made by the standard extinction coefficient method, and gave results as follows:

a. Vitamin A potency, as calculated from vitamin content of raw materials, per gram of dry product_____u__ 40,000
b. Vitamin A potency per gram found on assay of freshly made material_____u__ 41,000
c. Vitamin A potency per gram found on assay after exposure of material to sunlight for 15 weeks_____u__ 37,980
d. Percent loss, from calculated potency _____percent__ 5
   from initial assay_____do____ 7

Other material made in accordance with this example was mixed in dry state with other vitamins, in the following formula:

| | G. |
|---|---|
| Dry vitamin powder, containing vitamins A, D, and tocopherols_____ | 64.80 |
| Thiamin chloride _____ | 0.648 |
| Riboflavin _____ | 0.648 |
| Pyridoxin hydrochloride _____ | 0.324 |
| Pantothenic acid, as calcium pantothenate _____ | 1.179 |
| Nicotinamide _____ | 5.40 |
| Ascorbic acid _____ | 16.20 |
| Starch _____ | 10.801 |
| Total _____ | 100.00 |

This dry vitamin mixture was filled into ordinary gelatin capsules, each containing about 0.5 g. of the mixture. Such capsules were subjected to aging exposures and assayed to determine stability of vitamin content. Vitamin A assays gave the following results:

| | | Potency per gram | Difference from initial assay |
|---|---|---|---|
| | | Units | Per cent |
| a___ | Initial assay, of freshly made material. | 26,825 | _____ |
| b___ | After exposure to sunlight— | | |
| | (1) for 11 weeks_____ | 25,740 | 4 |
| | (2) for 30 weeks_____ | 22,320 | 17 |
| c___ | After exposure at room temperature— | | |
| | (1) for 15 weeks_____ | 25,200 | 6 |
| | (2) for 20 weeks_____ | 26,280 | 2 |
| | (3) for 24 weeks_____ | 25,920 | 3.5 |

The 2 to 6 percent difference from initial assay indicated by these results shows the capsule-contained mixture to be satisfactory for distribution in such ordinary capsules and by distribution procedures commonly used for other stable products. The satisfactory nature of the product is further shown by the result of 30 weeks' exposure to sunlight, for this represents about 4 years' exposure under ordinary packaging conditions, and the indicated loss of only 17 percent is remarkably small for such exposure.

*Example 2*

A dry product containing 80,000 units of vitamin A, 4800 units of vitamin B, and 30 units of natural tocopherols per gram is made as follows:

To 25 liters of fresh distilled water are added 740 g. of citrus pectin, the mixture is stirred under an atmosphere of $CO_2$, allowed to stand overnight, and intermittently stirred the following morning. To this mixture are added 250 cc. of a solution containing 43.7 mg. of amaranth No. 107, 65.7 mg. of ponceau SX, and 1.3 mg. of brilliant blue FCF per cc., and the resulting mixture is thoroughly stirred.

A separate mixture is prepared of 1725 g. of a dry starch hydrolysate ("Stanodex") containing dextrin, dextrose and maltose in about 4 liters of water.

A vitamin-containing mixture is prepared by thoroughly stirring together 535 g. of vitamin A concentrate (containing 485,800 units per gram), 212 g. of oil containing 46 percent natural tocopherols, and 3.12 g. of vitamin D concentrate (containing 5,000,000 units per gram), and 7.5 g. of lecithin.

The three separate mixtures are now combined. The vitamin-containing oil is added to the pectin solution and thoroughly stirred for about half an hour. The stirred mixture is then placed in a recirculating homogenizer which forces it through openings of about one-sixteenth inch diameter under a pressure of about 750 pounds per square inch, at a rate of about 8 liters per minute. The recirculating homogenizer is operated for about 10 minutes, in which time the mixture passes through the homogenizer about three times. About a third of the carbohydrate solution is then added and the homogenization proceeds for about 5 minutes. A second one-third portion of the carbohydrate solution is added, and the homogenization continued for about 5 minutes. The remainder of the carbohydrate solution is then added, and homogenization continued for a further period of about 20 to 30 minutes.

The homogenized mixture now contains the oil in a state of fine and uniform dispersion. Tests of such mixtures show an oil particle size averaging about 3–4 microns and varying in size from 1 micron or less for the smallest particles up to about 15 microns for the largest particles.

This mixture is spray dried, by discharging from a rotating head in a fine spray into a chamber supplied with air at an entering temperature of about 350° F. The dry product is continuously recovered from the drier, and is obtained as a free-flowing fine powder. Assays of material prepared in accordance with this example show that its process of preparation causes substantially no loss of vitamin activity.

This material may be filled into hard gelatin capsules by usual filling methods, to provide prepared dosage units of the three vitamins. For example, a capsule containing 250 mg. of the dry material will provide 20,000 u. of vitamin A, 1200 units of vitamin D, and 7.5 mg. of natural tocopherols.

Accelerated aging tests of material prepared in accordance with this example show the material to have a stability of the same high order as the material of Example 1, with changes in potency of the order of less than about 5 percent after exposures equal to, or more severe than, those encountered in ordinary commercial packaging and distribution.

Example 3

A dry vitamin preparation containing about 20,000 units of vitamin A, without other vitamins and without a special light-absorbing ingredient, is made up in accordance with the procedure of Examples 1 and 2, using the following materials:

| | | |
|---|---|---|
| Citrus pectin | g | 37.5 |
| Water | cc | 1000 |
| Glucose | g | 280 |
| Water | cc | 100 |
| Nor-dihydroguaiaretic acid | g | 0.06 |
| Lecithin | g | 1.5 |
| Vitamin A concentrate (200,000 units/g) | g | 37.5 |

The dry vitamin product obtained by spray drying, the homogenized mixture of the foregoing formula, was subjected to aging exposing tests and assayed for vitamin A potency, with the following results:

| | Potency per gram | Difference from initial assay |
|---|---|---|
| | Units | Per cent |
| a. Initial assay, of fresh material | 21,060 | |
| b. After exposure in oven at 45° C. for 7 weeks (representing 1 year at room temperature) | 19,800 | 5 |

Another batch of material similiarly prepared but containing less vitamin A, and containing "Stanodex" instead of glucose, gave test results as follows:

| | Potency per gram | Difference from initial assay |
|---|---|---|
| | Units | Per cent |
| a. Initial assay, fresh material | 14,682 | |
| b. After 7 weeks at 45° C | 14,580 | 0.7 |

A third batch of material similarly prepared gave test results as follows:

| | Potency per gram | Difference from initial assay |
|---|---|---|
| | Units | Per cent |
| a. Initial assay, fresh material | 21,240 | |
| b. After 8 weeks' exposure at 45° C | 20,700 | 2.5 |

A fourth batch of material similarly prepared but colored with the dye mixture of Example 1, gave test results as follows:

| | Potency per gram | Difference from initial assay |
|---|---|---|
| | Units | Per cent |
| a. Initial assay, fresh material | 20,880 | |
| b. After 9 weeks' exposure to sunlight | 20,520 | 1.7 |

Example 4

A dry vitamin preparation containing about 62,500 units per gram of vitamin A and 6250 units per gram of vitamin D (without tocopherols, and without a special light-absorbing material) is made up by the procedure of Examples 1 and 2, using the following materials:

| | | |
|---|---|---|
| Citrus pectin | g | 12.50 |
| Water, distilled | cc | 333.00 |
| "Stanodex" | g | 74.63 |
| Water, distilled | cc | 108.00 |
| Lecithin | g | 0.25 |
| Nor-dihydroguaiaretic acid | g | 0.02 |
| Vitamin D concentrate (5,000,000 units/g.) | g | 0.086 |
| Vitamin A concentrate | g | 12.50 |

The dry vitamin product is obtained by spray drying the homogenized mixture of this formula, and is obtained as a free-flowing powder. Aging tests and assay show it to have high stability, and to be satisfactory for packaging and distribution by ordinary procedures.

Example 5

A dry vitamin preparation containing about 100,000 units per gram of vitamin A, 6000 units per gram of vitamin D, and 40 mg. per gram of natural tocopherols is made up by the procedure of Examples 1 and 2, using the following materials:

| | | |
|---|---|---|
| Citrus pectin | g | 20.00 |
| Water, distilled | cc | 700.00 |
| Certified food color mixture (from Example 1) | cc | 6.40 |
| "Stanodex" | g | 48.34 |
| Water, distilled | cc | 120.00 |
| Lecithin | g | 0.50 |
| Vitamin D concentrate (5,000,000 units/g.) | g | 0.12 |
| Natural tocopherol oil (42.1 percent active) | g | 9.55 |

The dry vitamin product is obtained by spray drying the mixture of this formula, and is obtained as a dry free-flowing powder. Aging tests and assay show it to have high stability, and to be satisfactory for packaging and distribution by ordinary procedures.

Example 6

A dry vitamin A preparation containing more than 100,000 units of vitamin A activity per gram is prepared as follows.

The materials set forth below are combined in the proportions given to form three mixtures:

| | | |
|---|---|---|
| a. Citrus pectin | g | 20 |
| Water | cc | 850 |
| Certified food color solution (from Example 1) | cc | 6.4 |
| b. "Stanodex" | g | 68.752 |
| Water | cc | 125 |
| c. Lecithin | g | 0.5 |
| Synthetic vitamin A acetate oil solution (assaying 1,202,500 units/g.) | g | 10 |

As in Examples 1 and 2, the vitamin solution is mixed into the pectin solution and homogenized, and the carbohydrate solution is added during the homogenizing. The resulting emulsion is spray dried, and yields a free-flowing powder. The product assays 113,057 units of vitamin A activity per gram, whereas the full theoretical potency, based on the assay of the vitamin solution used, is 120,250 units per gram. The difference, less than 6 percent and within the range of assay variation, indicates no substantial loss of potency in the processing. The material is readily filled in ordinary hard capsules, and may be distributed by usual procedures for hard capsule-contained products.

Example 7

A dry vitamin D preparation containing about 100,000 units per gram of vitamin D is prepared as follows.

The materials set forth below are combined in the proportions given to form three mixtures:

a. Citrus pectin _____ g__ 40
   Water _____ cc__ 2000
b. "Stanodex" _____ g__ 20
   Water _____ cc__ 125
c. Vitamin D, as alcoholic concentrate
   (5,000,000 units/g.) _____ g__ 20
   Cottonseed oil _____ g__ 20

As in Examples 1 and 2, these three solutions are mixed and homogenized, preferably by first dispersing the vitamin oil solution (c) in the pectin solution (a), and adding the carbohydrate solution (b) during the homogenization. The resulting emulsion is spray dried, and yields a free-flowing powder. The theoretical potency of the product, based on the assay of the vitamin concentrate used, is 1,000,000 units per gram. Assay of material prepared in accordance with this example gave a potency of 1,070,000 units per gram. The difference, an indicated increase of 7 percent, indicates no substantial loss of potency in the processing. The material is readily filled in ordinary hard capsules, and may be distributed by the usual procedures for such hard capsule products.

Example 8

A dry tocopherol-containing product containing about 100 mg. of tocopherols per gram, is prepared as follows.

The materials set forth below are combined in the proportions given to form three mixtures:

a. Citrus pectin _____ g__ 25
   Water _____ cc__ 1100
   Certified food color solution (from
   Example 1) _____ cc__ 6.4
b. "Stanodex" _____ g__ 51.292
   Water _____ cc__ 125
c. Lecithin _____ g__ 0.5
   Distilled tocopherols, natural type
   (44.6 per cent activity) _____ g__ 22.5

An antioxidant may be added if desired.

The tocopherol mixture is dispersed in the pectin solution, with vigorous stirring, and the mixture is homogenized. During homogenization, the carbohydrate solution is added in fractional increments, with the homogenizing continued between such additions, say for periods of about 5 minutes, and the complete mixture is further homogenized for about 30–35 minutes. The combined and homogenized mixture is spray dried, and yields a dry powder having a theoretical potency (calculated on moisture-free basis) of 100 mg. of tocopherol per gram of powder. Assays of powder prepared in accordance with this example give 96 mg. tocopherols in powder containing 3 percent moisture, or an indicated difference from the theoretical of only about one percent.

Example 9

Multiple-vitamin products may be prepared by mixing the single vitamin powders of Examples 6, 7, and 8, with or without other dry vitamin materials, such as thiamin chloride, nicotinamide, calcium pantothenate, riboflavin, ascorbic acid, etc., and such mixtures may be filled in hard capsules in predetermined dosage units. Illustratively, capsules containing 25,000 units of vitamin A, 5000 units of vitamin D and 25 mg. of natural tocopherols are prepared by filling capsules with 500 mg. portions of a mixture in the following proportions:

|  | Mg. |
|---|---|
| Vitamin A powder, from Example 6 | 230 |
| Vitamin D powder, from Example 7 | 5 |
| Natural tocopherol powder, from Example 8 | 265 |

Example 10

Other vitamin-active materials may be used with or in place of those specifically set forth in the foregoing examples. Thus, instead of obtaining the vitamin activity by the use of natural vitamin-containing oils, as in Example 1, isolated natural vitamin-active materials or synthetic vitamin-active materials may be used in place of or to fortify the natural oils. The vitamin-active materials used may be chemically either the same as those of natural materials or may be different therefrom, as in the form of vitamin-active chemical derivatives, for example esters of natural or synthetic vitamin-active compounds. Illustratively, synthetic vitamin A ester is used in Example 9 in the place of the natural vitamin A of Example 1. Likewise, instead of the natural tocopherol oil used in earlier examples, other materials having vitamin E activity may be used, such as synthetic d-, or dl-alpha tocopherols, or active isomers of such materials, or esters of natural or synthetic materials, e. g. the acetate or succinate of natural tocopherols; and instead of the vitamin D concentrate used in earlier examples, other vitamin D materials may be used, and when solid or crystalline compounds are used, they may be dissolved in an oil carrier, as in an oil which supplies other vitamins.

I claim:

1. A dry vitamin-A-containing product comprising ungelled pectin, carbohydrate material derivable by starch hydrolysis, which is at least partially water soluble, and vitamin-A-bearing oil dispersed therein, there being present for each part of oil about 1 to 2 parts of pectin and about 1 to 6 parts of carbohydrate, said product being in the form of fine particles and being characterized by the substantially complete stability of the vitamin A potency thereof.

2. A pulverulent product containing an oil-soluble vitamin comprising as components ungelled pectin, at least partially water-soluble, starch hydrolysate, and an oleaginous vitamin-containing material indistinguishably merged therein.

3. An oil-soluble vitamin composition which comprises a pulverulent mixture containing at least about 1 to 2 parts of ungelled pectin, about 1 to 6 parts of at least partially water-soluble starch hydrolysate, and about 1 part of an oleaginous vitamin-containing material indistinguishably merged with the pectin and the carbohydrate.

ARCHIE LEE CALDWELL.

(References on following page)

REFERENCES CITED

The following references are of record in the file of this patent:

UNITED STATES PATENTS

| Number | Name | Date |
|---|---|---|
| 1,703,377 | Anderson | Feb. 26, 1929 |
| 2,183,053 | Taylor | Dec. 12, 1939 |
| 2,218,591 | Taylor | Oct. 22, 1940 |
| 2,218,592 | Taylor | Oct. 22, 1940 |
| 2,283,531 | Briod | May 19, 1942 |
| 2,314,527 | Taylor | Mar. 23, 1943 |
| 2,321,400 | Lubarsky | June 8, 1943 |
| 2,348,503 | Taylor | May 9, 1944 |
| 2,410,110 | Taylor | Oct. 29, 1946 |

FOREIGN PATENTS

| Number | Country | Date |
|---|---|---|
| 533,323 | Great Britain | Feb. 11, 1941 |